United States Patent
Siomina et al.

(10) Patent No.: US 11,641,233 B2
(45) Date of Patent: May 2, 2023

(54) CONTROLLING SIGNAL MEASUREMENTS IN BEAMFORMING WIRELESS DEVICES

(71) Applicant: TELEFONAKTIEBOLAGET LM ERICSSON (PUBL), Stockholm (SE)

(72) Inventors: Iana Siomina, Täby (SE); Muhammad Kazmi, Sundbyberg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/957,416

(22) PCT Filed: Jan. 21, 2019

(86) PCT No.: PCT/IB2019/050494
§ 371 (c)(1),
(2) Date: Jun. 24, 2020

(87) PCT Pub. No.: WO2019/142165
PCT Pub. Date: Jul. 25, 2019

(65) Prior Publication Data
US 2020/0350975 A1   Nov. 5, 2020

Related U.S. Application Data

(60) Provisional application No. 62/620,458, filed on Jan. 22, 2018.

(51) Int. Cl.
*H04B 7/08* (2006.01)
*H04B 7/06* (2006.01)
(Continued)

(52) U.S. Cl.
CPC ............ *H04B 7/088* (2013.01); *H04B 7/0617* (2013.01); *H04W 8/24* (2013.01); *H04W 16/28* (2013.01); *H04W 24/10* (2013.01)

(58) Field of Classification Search
CPC ........ H04B 7/088; H04B 7/0617; H04B 7/06; H04B 7/08; H04B 7/086; H04B 7/0452;
(Continued)

(56) References Cited

U.S. PATENT DOCUMENTS

2013/0286960 A1   10/2013   Li et al.
2016/0006122 A1   1/2016   Seol et al.
(Continued)

FOREIGN PATENT DOCUMENTS

EP    1069713 A    1/2001
EP    3261176 A2   12/2017
(Continued)

OTHER PUBLICATIONS

Huawei et al., "Beam reporting for beam management", 3GPP TSG RAN WG1 #90, Prague, Czech Republic, Aug. 21-25, 2017, pp. 1-11, R1-1713757, 3GPP.

*Primary Examiner* — Fred A Casca

(57) ABSTRACT

Methods and apparatus for controlling signal measurements in a wireless device with receiver beamforming capability. In an embodiment, the method is performed by a wireless device and includes providing a first indication to a radio node of how the wireless device performs or will perform receiver beamforming, and performing receiver beamforming as part of a signal measurement procedure in accordance with the first indication of how the wireless device performs or will perform receiver beamforming.

17 Claims, 12 Drawing Sheets

(51) Int. Cl.
*H04W 8/24* (2009.01)
*H04W 16/28* (2009.01)
*H04W 24/10* (2009.01)

(58) Field of Classification Search
CPC .. H04B 7/0626; H04B 7/0456; H04B 7/0413;
H04B 7/0632; H04B 7/0639; H04B
7/024; H04B 7/0417; H04B 7/0695;
H04B 7/043; H04B 7/0619; H04B
7/0469; H04B 7/04; H04B 7/0408; H04B
7/0697; H04B 7/0897; H04B 7/10; H04B
7/02; H04W 8/24; H04W 16/28; H04W
24/10; H04W 48/20; H04L 5/0048; H04L
5/0023; H04L 25/0204
See application file for complete search history.

(56) References Cited

U.S. PATENT DOCUMENTS

| | | | |
|---|---|---|---|
| 2016/0218786 A1 | 7/2016 | Mizusawa | |
| 2017/0373740 A1 | 12/2017 | Guo et al. | |
| 2018/0034515 A1* | 2/2018 | Guo | ............... H04B 7/043 |
| 2018/0219597 A1 | 8/2018 | Irie et al. | |
| 2020/0288364 A1* | 9/2020 | Yao | ............... H04W 36/08 |

FOREIGN PATENT DOCUMENTS

| | | |
|---|---|---|
| JP | 2015045658 A | 3/2015 |
| WO | 2016022235 W | 2/2016 |

* cited by examiner

CONTROLLING SIGNAL MEASUREMENTS IN BEAMFORMING WIRELESS DEVICES

This application is a 371 of International Application No. PCT/IB2019/050494, filed Jan. 21, 2019, which claims the benefit of and priority to U.S. Provisional Application 62/620,458, filed Jan. 22, 2018, entitled "CONTROLLING SIGNAL MEASUREMENTS IN BEAMFORMING WIRELESS DEVICES," the disclosures of which are fully incorporated herein by reference.

TECHNICAL FIELD

The present application generally relates to wireless communication systems, and particularly relates to controlling signal measurements in a wireless device operable to use receive beamforming in a wireless communication system.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Cellular communication systems typically comprise a land-based network that provides wireless coverage to wireless communication devices that may be stationary or, if mobile, can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often referred to as "base stations". As a wireless device moves from one cell to another, the network hands over responsibility for serving the mobile device from the presently-serving cell to the "new" cell. In this way, the user of the wireless device experiences continuity of service without having to re-establish a connection to the network.

FIG. 1 illustrates a cellular communication system or network 100 providing a system coverage area by means of a plurality of radio access nodes 110 (e.g., eNodeBs or other base stations) to a plurality of wireless communication devices 105 (e.g., conventional UEs, machine type communication [MTC]/machine-to-machine [M2M] UEs). Communication network 100 is organized into cells 115, which are connected to a core network 120 via corresponding radio access nodes 110. Radio access nodes 110 are capable of communicating with wireless communication devices 105 along with any additional elements suitable to support communication between wireless communication devices or between a wireless communication device and another communication device (such as a landline telephone). In certain embodiments, communication network 100 is a Long Term Evolution (LTE) network, compliant with LTE standards as defined by 3GPP and/or is an New Radio (NR) network, compliant with NR standards as defined by 3GPP. Note that terminology used here such as eNodeB/gNB and UE should be considering non-limiting and does in particular not imply a certain hierarchical relation between the two; in general "eNodeB/gNB" could be considered as device 1 and "UE" device 2, and these two devices communicate with each other over some radio channel.

I. NR Architecture

In NR (a.k.a. 5G or Next Generation), an architecture of communication network 100 is being discussed in 3GPP research activities and a current network architecture concept is illustrated in FIG. 8, where "eNB" denotes an LTE eNodeB, "gNB" denotes an NR base station (BS) (one NR BS may correspond to one or more transmission/reception points), and the lines between the nodes illustrate the corresponding interfaces which are under discussion in 3GPP. Further, FIG. 9 illustrates four different deployment scenarios with NR BSs which are discussed in 3GPP research activities.

II. Multi-Antenna Schemes in NR

Multi-antenna schemes for NR are currently being discussed in 3GPP research activities. For NR, frequency ranges up to 100 GHz are considered. It is known that high-frequency radio communication above 6 GHz suffers from significant path loss and penetration loss. One solution to address this issue is to deploy large-scale antenna arrays to achieve high beamforming gain, which is a reasonable solution due to the small wavelength of high-frequency signal. Therefore, MIMO schemes for NR are also called massive MIMO. For around 30/70 GHz, up to 256 Tx and Rx antenna elements are assumed. Extension to support 1024Tx at 70 GHz is agreed and it is under discussion for 30 GHz. For sub-6 GHz communication, to obtain more beamforming and multiplexing gain by increasing the number of antenna elements is also a trend.

With massive MIMO, three approaches to beamforming have been discussed: analog, digital, and hybrid (a combination of the two). The analog beamforming would compensate high pathloss in NR scenarios, while digital precoding would provide additional performance gains similar to MIMO for sub-6 GHz necessary to achieve a reasonable coverage. The implementation complexity of analog beamforming is significantly less than digital precoding since it is in many implementations relies on simple phase shifters, but the drawbacks are its limitation in multi-direction flexibility (i.e., a single beam can be formed at a time and the beams are then switched in time domain), only wideband transmissions (i.e., not possible to transmit over a subband), unavoidable inaccuracies in the analog domain, etc. Digital beamforming (requiring costly converters to/from the digital domain from/to IF domain), used today in LTE, provides the best performance in terms of data rate and multiplexing capabilities (multiple beams over multiple subbands at a time can be formed), but at the same time it is challenging in terms of power consumption, integration, and cost; in addition to that the gains do not scale linearly with the number of transmit/receive units while the cost is growing rapidly. Supporting hybrid beamforming, to benefit from cost-efficient analog beamforming and high-capacity digital beamforming, is therefore desirable for NR. An example diagram of circuitry configured to perform hybrid beamforming is shown in FIG. 10. Beamforming can be on transmission beams and/or reception beams, network side or UE side.

The analog beam of a subarray can be steered toward a single direction on each OFDM symbol, and hence the number of subarrays determines the number of beam directions and the corresponding coverage on each OFDM symbol. However, the number of beams to cover the whole serving area is typically larger than the number of subarrays, especially when the individual beam-width is narrow. Therefore, to cover the whole serving area, multiple transmissions with narrow beams differently steered in time domain are also likely to be needed. The provision of multiple narrow coverage beams for this purpose has been called "beam sweeping". For analog and hybrid beamforming, beam sweeping techniques provide basic coverage in NR. For this purpose, multiple OFDM symbols, in which differently steered beams can be transmitted through subarrays, can be assigned and periodically transmitted. FIG. 11 graphically illustrates beams being swept on two subarrays (represented by shaded beams) at a series of instances in time. FIG. 12 illustrates beam being swept on three subarrays at a series of instances in time.

Although these various forms of beamforming can be used to improve signal gain when high-frequency carriers are used, there are certain shortcomings associated with conventional techniques and technologies of performing signal measurements in UEs that perform beam sweeping.

For example, a UE changing the directions of receiver beams or implementing receiver beam sweeping in an analog way may not be able to simultaneously receive signals from all directions, e.g., from different transmission points (TPs), different transmission/reception points (TRPs), different cells, or even from different BS transmitter beams. At the same time the UE is required to perform measurements on multiple cells, search for and identify which cells are best to connect with, perform radio link management (RLM) on a serving cell on multiple synchronization signal blocks (SSBs) (each associated with different transmitter beams of a cell). In LTE systems, the UE is simultaneously performing these activities, without being limited by analog beam sweeping. In NR systems, due to the possible analog implementation of beam sweeping in some UEs, the requirements for such UEs have to be relaxed.

According to one conventional approach, to account for such UEs with analog beam sweeping, the measurement period is relaxed, e.g. scaled with the number of receiver beam sweeps, which can be quite large since the maximum supported number of transmission beams or SSBs per cell in NR is 64. Furthermore, if generic requirements are to be specified for all UEs, irrespective of how the UE implements beam sweeping, the requirements for all NR UEs need to be relaxed, which will lead to long delays for cell identification, measurements, RLM, etc., and a worse overall performance of NR compared to LTE. On the other hand, if the requirements are not relaxed, then hard constraints will be imposed on how the UEs implement receiver beamforming or sweeping of the receiver beams. Such constraints will in turn increase UE costs, which may make NR UEs less attractive.

SUMMARY

Several of the techniques and apparatus described herein address the above issues and facilitate faster and more efficient measurements for cell detection, cell identification, RLM, mobility procedures, handover, and the like in a UE capable of beam sweeping, such as a UE in an NR communications system.

In one embodiment, a UE indicates implicitly or explicitly to a network node or another UE one or both of how it is performing or going to perform receiver beamforming, and the applicable requirement the UE is able to meet based on how it is performing or going to perform its receiver beamforming. UE signal measurement procedures may be performed accordingly (in accordance with the indication) and may be configured to meet the applicable requirement. In one example, the UE indicates a number of receiver beam sweeps required by the UE for performing a measurement. In another example the UE indicates a number of receiver beam sweeps required by the UE for performing a measurement based on the signal level or signal quality of the measurement e.g. SINR and/or carrier frequency. In yet another example the UE indicate whether the UE can adapt a number of receiver beam sweeps required by the UE for performing a measurement, wherein the adaptation is based on whether or not the UE is receiving and/or transmitting signals other than the reference signals (RS) used for the measurement. For example, if the UE is performing only measurements (and no data or control channel reception or transmission) then the UE may apply fewer receive beam sweeps compared to the case where the UE also receives and/or transmit signals other than the RS used for the measurements.

According to another embodiment, methods are described for how the UE requirements are determined depending on how the UE is performing receiver beamforming. In one example the UE may perform measurements over a measurement time (T1) if the UE is only performing the measurements on RS and not receiving and/or transmitting any other signals in at least partly overlapping time resources, whereas it may perform measurement over a measurement time (T2) if the UE is performing the measurements on RS and also receiving and/or transmitting other signals in at least partly overlapping time period (T2), where T2>T1 because larger number of receive beam sweeps is applied by the UE in the latter case. In another example, the UE performs measurements on neighbor cells during a measurement time T1 if the UE is not performing measurements and not receiving signals/channel from a serving cell on the same carrier frequency during T1, while the UE performs measurements on neighbor cells during a measurement time T2 (T2>T1) if the UE is performing measurements and/or receiving signals/channels from a serving cell on the same carrier frequency during the time at least partly overlapping with T2 because the UE generally may not able to use the same receiver beam for the serving cell and neighbor cell at the same time and thus will perform one of them at a time (serving cell may also be prioritized in which case performing neighbor cell measurements may take time T3>T2, compared to the case when no priorities are used as in T2).

According to another embodiment, a network node determines how the UE is performing receiver beamforming, e.g., based on UE indication or observing UE behavior. Based on the result of the determining, the network node may further determine the applicable UE requirement and configure one or more UE procedures adaptively to the determined requirement. The network node may further adapt one or more own procedures, based on the result of determining how the UE is performing receiver beamforming. According to another aspect of this embodiment the network node may configure the UE that while performing certain type of measurement the UE should disable any receive beam sweeping or apply a number of receive beam sweeps not exceeding certain threshold value (e.g. 2). In response the UE will not apply receiver beam sweeping or apply the reduced number of beam sweeps while doing the measurement. In this case the UE may also perform measurement only on 1 or limited number of cells (e.g. 2) and/or it may perform measurement on cells whose received signal level and/or signal quality is above certain threshold (e.g. SINR 2-3 dB). Examples of such measurements are those done for positioning, SON etc (e.g. CGI acquisition etc).

According to yet another embodiment, a network node indicates to another network node or a second UE one or both of: how the UE is performing or going to perform receiver beamforming, and the applicable requirement the UE is able to meet based on how it is performing or going to perform its receiver beamforming.

The embodiments described herein may be combined with each other, e.g., the network node embodiments may be based on UE embodiments describing the indication or the UE or network embodiments may be combined with the embodiments for determining the UE requirements.

BRIEF DESCRIPTION OF THE DRAWINGS

The drawings illustrate selected embodiments of the disclosed subject matter. In the drawings, like reference labels denote like features.

DETAILED DESCRIPTION

Figure 1:
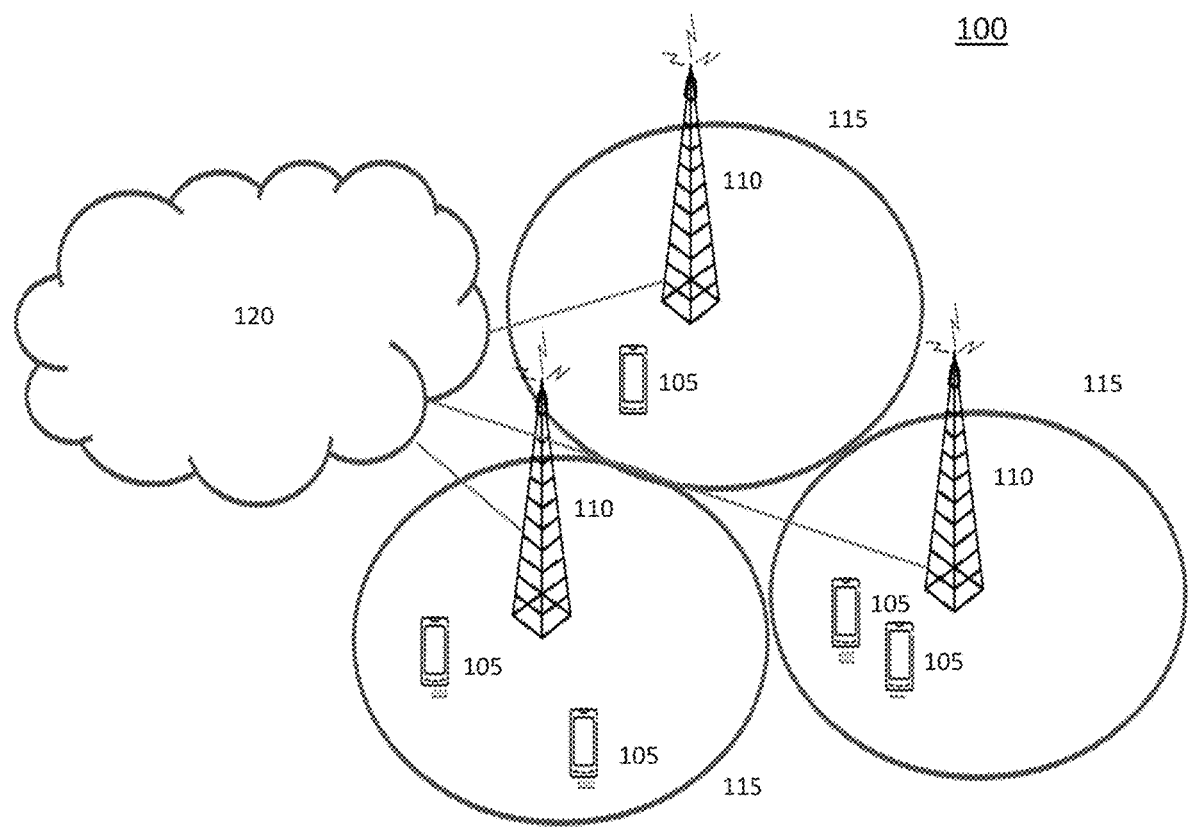
FIG. 1 is a diagram illustrating a wireless communication network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

I. Terminology

Note that a cell as used herein may be a physical cell or a virtual cell, e.g., provided by one or more transmission points, TRPs. A physical cell may be for instance identified by a physical-layer cell identity, PCI, e.g., as defined in 3GPP standards. This PCI may be tied to primary and/or secondary synchronization signals, PSS/SSS, and a cell reference signal, CRS, for the cell. A virtual cell by contrast may be created within a physical cell, e.g., along with zero or more other virtual cells. The virtual cell's identity may be tied to a channel state information reference signal, CSI-RS in the cell or any type of reference signal transmitted in the cell.

A wireless device is any type device capable of communicating with a radio network node or another wireless device wirelessly over radio signals. A wireless device may therefore refer to a user equipment, a mobile station, a laptop, a smartphone, a machine-to-machine (M2M) device, a machine-type communications (MTC) device, a narrowband Internet of Things (IoT) device, etc. A user equipment in this regard does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IoT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

As used herein, radio access node comprises any radio node capable, configured, arranged and/or operable to communicate directly or indirectly with a wireless device and/or with other equipment in the wireless communication system that enable and/or provide wireless access to the network equipment. Examples of radio access nodes include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, a radio access node may be any suitable device (or group of devices) capable, configured, arranged, and/or operable to enable and/or provide a wireless device access to the wireless communication network or to provide some service to a wireless device that has accessed the wireless communication network. The list above is not intended to express just alternative radio access nodes, but to express various examples of classes of radio access node equipment as well as examples of specific radio access node equipment.

A BS may comprise, e.g., gNB, ng-eNB, or en-gNB described in 3GPP TS 38.300 v15.0.0 and 3GPP TS 37.340 v15.0.0, or a relay node, or any BS compliant with the embodiments.

A radio node, as used herein, may be used to denote a UE or a radio access node.

Signaling, as used herein, may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

A radio measurement, as used herein, may refer to any measurement performed on radio signals. Radio measurements can be absolute or relative. Radio measurement may be called as signal level which may be signal quality and/or signal strength. Radio measurements can be e.g. intra-frequency, inter-frequency, inter-RAT measurements, CA measurements, etc. Radio measurements can be unidirectional (e.g., DL or UL) or bidirectional (e.g., RTT, Rx-Tx, etc.). Some examples of radio measurements: timing measurements (e.g., TOA, timing advance, RTT, RSTD, Rx-Tx, propagation delay, etc.), angle measurements (e.g., angle of arrival), power-based measurements (e.g., received signal power, RSRP, received signal quality, RSRQ, SINR, SNR, interference power, total interference plus noise, RSSI, noise power, etc.), cell detection or cell identification, radio link monitoring (RLM), system information (SI) reading, SFN frame time difference (SFTD), SFN sub-frame time difference (SSTD), ratio of reference signal received energy per resource element to total noise (RS Es/Iot) etc. Some specific examples of RSRP are SS-RSRP, CSI-RSRP, NRSRP etc. Some specific examples of RSRQ are SS-RSRQ, CSI-RSRQ, NRSRQ etc. Some specific examples of SINR are RS-SINR, SS-SINR, CSI-SINR etc.

The term measurement performance used herein may refer to any criteria or metric which characterizes the performance of the measurement performed by a radio node. The term measurement performance is also called as measurement requirement, measurement performance requirements etc. The radio node has to meet one or more measurement performance criteria related to the performed measurement Examples of measurement performance criteria are measurement time, number of cells to be measured with the measurement time, measurement reporting delay, measurement accuracy, measurement accuracy with respect to a reference value (e.g. ideal measurement result) etc. Examples of measurement time are measurement period, cell detection or cell identification period, evaluation period (e.g. cell evaluation or RLM in-sync or RLM out-of-sync evaluation), beam detection or beam identification period, SSB index acquisition time, SI reading time, etc.

The term numerology here may comprise any one or a combination of: subcarrier spacing, number of subcarriers within a bandwidth, resource block size, symbol length, CP length, etc. In one specific non-limiting example, numerology comprises subcarrier spacing of 7.5 kHz, 15 kHz, 30 kHz, 60 kHz, 120 kHz, or 240 kHz. In another example, numerology is the CP length which may be used with subcarrier spacing 30 kHz or larger.

The term beamforming herein may comprise any one or more of e.g. beam sweeping, beamforming, beam switching etc. The term receiver beamforming or receive beamforming herein may comprise any one or more of e.g. receiver beam sweeping or receiver beam sweeps, receiver beamforming, receiver beam switching etc.

II. Methods in a Wireless Device

According to one embodiment, a wireless device (also referred to herein as a UE) provides an indication (whether implicitly or explicitly) to a network node or another UE of one or both of: 1) how it is performing or going to perform receiver beamforming, and 2) the applicable measurement requirement the UE is able to meet based on how it is performing or going to perform its receiver beamforming.

Certain UE measurement procedures are performed accordingly (i.e., in accordance with the indication(s)) to meet the applicable measurement requirement.

The indication may include a UE preference, a UE configuration, or even a UE capability. The indication related to the receiver beamforming (e.g. beam sweep) can be a pre-defined configuration of the UE or it can be the current configuration of the UE or it can be the expected configuration of the UE at a future time (e.g. for the next measurement to be performed by the UE, over the next X time units such as 5 seconds etc), or it may be the configuration of the UE associated with a certain type of measurement (intra- or inter-frequency or inter-RAT, different measurement purpose e.g. RRM, mobility, positioning, SON, etc.; wide bandwidth or normal/narrow bandwidth measurements determined by a bandwidth threshold) or measurements on a certain type of the cells (e.g., serving or non-serving cells, small cell or macro cells, cell on F1 or cells on FR2, etc.). In some examples, the same UE may provide different indications, e.g., depending on conditions, UE operation type (e.g., CA or non-CA, number of configured and/or activated CCs, etc.), standalone NR or non-standalone NR operation, number of configured measurements, types of measurements (e.g., RRM, mobility, positioning, etc.—see also terminology section I above for more examples), types of channels to receive (e.g., broadcast, multicast, dedicated, MBMS, control channel, data channel, PBCH, etc.).

In one embodiment, explicit indication comprises a parameter or message transmitted to the network node or a second UE. In another embodiment, implicit indication comprises a UE operation method based on which it is possible to determine at least one parameter related to at least one of: 1) how the UE is performing or going to perform receiver beamforming, and 2) the applicable measurement requirement the UE can meet based on how it is performing or going to perform its receiver beamforming. Examples of the parameter or message contents include: a number reflecting or associated with the UE receive beam capability, where the number may be used, e.g., in the requirement (e.g., a larger number gives longer detection or measurement time); a number of configured or supported receive beam sweeps; a number of configured or supported receive beam directions; a minimum of the number of cells (or TRPs) to measure and the number of configured or supported beam sweeps; a requirement index (different indexes may be associated with different requirements depending on whether the requirement is associated with 1) how the UE is performing/going to perform receiver beamforming, or 2) the applicable measurement requirement the UE can meet;

Another example of the parameter or message contents includes an association between a signal level and/or signal quality and/or the carrier frequency or frequency range on one hand, and the number of receive beam sweeps (N) required for performing certain measurement(s) on the other hand. (Examples of signal levels are signal strength, signal quality, etc. Examples of signal strength are RSRP, SCH_RP, path loss, etc. Examples of signal quality are RSRQ, SNR, SINR, SS Es/Iot, etc. For example, the number of receive beam sweeps required by the UE for doing measurements may be larger for a lower signal level compared to the number of receive beam sweeps required for a higher signal level. As an example, when the signal quality (e.g. SINR) is below a threshold then the UE may need N1 number of receive beam sweeps for performing a measurement; but otherwise when the signal quality (e.g. SINR) is equal to or larger than the threshold then the UE needs N2 number of receive beam sweeps for performing the same type of measurement, where N1>N2 and as a special case N1>1 and N2=1.)

Another example of the parameter or message contents includes a number of receive beam sweeps required by the UE for doing measurements on certain type of a carrier frequency or frequency layer. Examples of types of carriers are intra-frequency carrier and corresponding measurements are intra-frequency measurements, inter-frequency carrier and corresponding measurements are inter-frequency measurements, inter-RAT carrier and corresponding measurements are inter-RAT measurements, configured carriers in multicarrier operation (e.g. measurements on PCC, SCC, PSC etc) etc.

Another example of the parameter or message contents includes a number of receive beam sweeps (N) required by the UE for doing measurements as function of number (K) of carrier frequencies on which the measurements are to be performed by the UE. The parameter N may increase with K. However the relation between the parameters N and K can be linear or non-linear, e.g., N=f($\alpha$, K), where $\alpha$ is the minimum number of receive beam sweeps required per carrier. In a specific example N=$\alpha$*K.

Another example of the parameter or message contents includes a number of beam sweeps the UE needs for doing certain type of measurements. Examples of types of measurements are RSRP/RSRQ, cell identification, out-of-sync evaluation for RLM, in-sync evaluation for RLM, SINR, SFTD, SSTD, positioning measurement (e.g. RSTD), etc. For example, the number of receive beam sweeps may depend on a number of cells involved in that measurement. An example for absolute RSRP measurement performed on a cell the number of receiver beam sweeps is N3, whereas for relative RSRP performed on a first cell (cell) and a second cell (cell2) the number of receive beam sweeps is N4 where N4>N3, e.g., N4=2*N3. A relative measurement on cell1 and cell2 comprise comparing measurement on cell1 with that on cell2 e.g. difference between RSRP on cell1 and RSRP on cell2. In yet another example the number of receive beam sweeps required by the UE for SFTD or SSTD is N5 where N5>N3. The SFTD or SSTD measurement involves comparison of timing of two cells, e.g., PCell and PSCell.

Another example of the parameter or message contents includes a parameter indicating whether the UE can adapt the number of receive beam sweeps for measurements based on whether in the same or overlapping time resources the UE is also receiving and/or transmitting signals (non-RS) which are not used for measurements. The adaptation may further depend on the relation between the subcarrier spacing (SCS) of the RS (e.g. SSB) used for measurements and the SCS of the signals other than the RS used for measurements. This is realized by using the antenna arrays for measurements even though it is primarily used for purpose other than measurements (e.g., reception of control and/or data channel). In one example, the UE may indicate that the UE needs the same number of receive beam sweeps for doing measurements regardless of whether the UE is receiving and/or transmitting control channel and/or data channel. In a second example the UE may indicate that the UE can adapt the number of receive beam sweeps for doing measurements on RS depending on whether the UE is receiving and/or transmitting control channel and/or data channel. Examples of control channels are PDCCH, PUCCH, PBCH etc. Examples of data channels are PDSCH, PUSCH, etc.

In the example embodiment where the UE can adapt the number of receive beam sweeps (described immediately above), the UE may indicate the need for a number of receive beam sweeps if the SCS of the RS and non-RS signals are the same. For example, a number N6 of receive beam sweeps may be indicated for doing the measurement on cells of a certain carrier on Y1 time resources in case the UE is also receiving data channel in the Y2 resources which at least partly overlap in time with Y1 time resources. Alternatively, a number N7 of receive beam sweeps may be indicated for doing the measurement on cells of a certain carrier on Y1 time resources in case the UE is not receiving any data channel in the Y2 resources which at least partly overlap in time with Y1 time resources, where N6>N7 (e.g. N6=4 whereas N7=2). A shorter value of receive beam sweeps (N7) is realized by using the unused antenna arrays or processing resources generally used for data and/or control channel.

Alternatively, in another example embodiment in which the UE can adapt the number of receive beam sweeps, the UE may indicate the need for a number of receive beam sweeps if the SCS of the RS and SCS of the non-RS signals are different and the UE can do measurements and receive signals on non-RS in overlapping time resources. For example, a number N8 of receive beam sweeps may be indicated for doing the measurement on cells of the carrier on Y1 time resources in case the UE is also receiving data channel in the Y2 resources which at least partly overlap in time with Y1 time resources. Alternatively, a number N9 of receive beam sweeps may be indicated for doing the measurement on cells of the carrier on Y1 time resources in case the UE is not receiving any data channel in the Y2 resources which at least partly overlap in time with Y1 time resources, where N8>N9 (e.g., N8=4 whereas N9=1). A much shorter value of receive beam sweeps (N9) is realized by using even more resources related to unused antenna arrays or processing resources (e.g. FFT or IFFT) generally used for data and/or control channel.

In another example, the UE may also receive an enabling/disabling indicator from a network node (see corresponding network nodes embodiments) controlling whether the UE is allowed to perform beam sweeping or not. This indicator can apply to all (in one example) or some types of (in another example) measurements. Furthermore, disabling receive beam sweeps may also comprise configuring wide beam or omni-directional reception in the UE, in contrast to a narrow beam reception if the enabling indicator is received.

III. Methods in a Network Node

A. Determining how UE is Performing Receiver Beamforming

According to another embodiment, a network node determines how the UE is performing receiver beamforming, e.g., based on a UE indication (see e.g. methods in UE embodiments), observing UE behavior, or indication received from another network node (e.g., from another BS, core network node or positioning node—see also Section B below). Based on the result of the determining, the network node may further determine the applicable UE requirement (see e.g., section IV below describing methods of determining the wireless device requirements) and configure one or more UE procedures adaptively to the determined requirement. The network node may further adapt one or more own procedures, based on the result of determining how the UE is performing receiver beamforming.

Configuring one or more UE procedures adaptively to the determined requirement may comprise, e.g.:
- Configuring UE intra- and/or inter-frequency measurements.
- Configuring measurement periodicity (may be shorter or the same as the transmitted DL signal periodicity), e.g., shorter periodicity if otherwise measurement time or measurement time requirement (based on how UE performs receive beamforming) become longer than a threshold.
- Configuring measurement bandwidth or allowed measurement bandwidth, e.g., larger bandwidth if otherwise measurement time or measurement time requirement (based on how UE performs receive beamforming) become longer than a threshold.
- Configuring the number of SSBs and/or beams and/or cells and/or frequencies to measure (e.g., smaller number of SSBs/beams/cells/frequencies to measure if the number of receive beam sweeps or receive beams is above a threshold).
- Configuring the UE to change to the cell in FR1 (instead of FR2 or millimeter-waves frequency range) if the UE does not support more than a threshold the number of receive beam sweeps or receive beams.
- Configuring frequencies to measure or monitor for the UE.
- Configuring black cell list (cells to not measure), e.g., including in the list the cells that may need extensive receive beamforming at the UE.
- Configuring one or more counters or timers in the UE, e.g., longer measurement validity timers if the measurement time is longer, configuring handover-related timers, configuring RLM or RLF timers.
- Configuring the number of samples for the UE measurement, based on the result of the determining.
- Indicating to the UE the requirement to be met (e.g., configuring the number of samples which determine the requirement or configuring the requirement ID or index, where different indexes may be associated with different requirements depending on whether the requirement is associated with 1) how the UE is performing/going to perform receiver beamforming, or 2) the applicable measurement requirement the UE can meet).

In yet another example the network node may configure the UE to disable the receive beam sweeps or to configure the UE with maximum number of allowed beam sweeps for doing all (in one example) or a certain type of (in another example) measurements. The measurement may be performed by the UE for specific purpose e.g. for positioning, SON function, network planning such as parameter tuning, MDT etc. This type of measurement is expected to be performed by the UE within pre-determined or deterministic time. The network node may further configure the UE with maximum number of cells on which the UE may perform measurements. In a specific example the UE may be configured to perform certain type of SON measurement (e.g. cell global ID (CGI) of a target cell) without any receiver beam sweep or with limited number of receiver beam sweep (e.g. 2 sweeps). In this case the UE may further be allowed not to perform any other measurement while it is doing the indicated measurement (associated with no beam sweep or limited number of beam sweeps). This in turn will allow the UE to perform the requested measurement within well-defined time period. This can also be realized by a pre-defined rule. For example, if the UE is configured with a specific type of measurement then during the measurement time of that measurement the UE shall perform only that measurement on a particular cell while it will disable receive beam sweep or the number of beam sweeps will not exceed certain value (e.g., 2).

Disabling receive beam sweeps may also comprise configuring wide beam or omni-directional reception in the UE.

Adapting one or more of the network node's procedures may comprise, for example, one or more of the following:
- Configuring one or more counters or timers related to the UE operation in the network node.
- Configuring at least one of its transmission to be received by the UE with receive beamforming (e.g., increase the transmitted signal bandwidth, density, periodicity, transmit power, etc. to allow faster measurement time and/or higher accuracy, based on 1) how the UE is performing/going to perform receiver beamforming, or 2) the applicable measurement requirement the UE can meet).
- Configuring the numerology of at least one transmission to be received by the UE with receive beamforming (e.g., increase subcarrier spacing if all UE support beam sweeping with at least N beams, otherwise do not increase or reduce subcarrier spacing).

B. Indication to Another Network Node or a Second UE

According to yet another embodiment, a network node indicates to another network node (e.g., another BS, core network node or positioning node) or a second UE one or both of: 1) how a UE is performing or going to perform receiver beamforming, and 2) the applicable measurement requirement the UE is able to meet based on how it is performing or going to perform its receiver beamforming.

How the UE is performing or going to perform receiver beamforming and/or the applicable measurement requirement the UE is able to meet may be received from another node (e.g., a UE or another network node) or determined by the network node by observing UE behavior or operation. The network node may then resend or relay this information to yet another network node or another UE (e.g., to allow this UE to optimize its transmissions to or the operation with the concerned UE).

The sending of the indication may be upon a request from the receiving node, in an unsolicited way, or as a part of a specific procedure (e.g., at handover the target cell may receive the indication from the source cell). The sending may also be selective, e.g., only when a parameter related to how the UE is performing or going to perform receiver beamforming and/or the applicable measurement requirement the UE is able to meet (see example parameters in the UE embodiments and methods for determining the requirement) is above a threshold.

IV. Methods of Determining Wireless Device Requirements

According to another embodiment, methods are described for how the wireless device or UE measurement requirements (may also be called as applicable requirement in another embodiment) are determined depending on how the UE is performing receiver beamforming. The UE is required to meet the determined requirement. The requirement may be static or unique for the UE or may be dynamic, depending on the current UE configuration or UE preference.

Examples of the determined UE measurement requirements includes a measurement time (see terminology section I above), which may be a function of at least one parameter related to how the UE is performing beamforming. The parameter may be received from the UE or determined based on a message received from the UE (see e.g., section II above for more details). Moreover, the parameter may be a UE capability signaled by the UE or declared by the UE (e.g., a UE with a certain declared capability will be tested using the requirement which is based on this declarable capability). Alternatively, the parameter may be determined based on a UE capability. Moreover, the parameter may be a result of observing UE behavior or UE performance (e.g., observing how long it takes for the UE to report a measurement for a serving cell and/or neighbor cell). Examples of the parameter are provided in section II above.

Examples of the function of the at least one parameter related to how the UE is performing beamforming include:

A function that scales with the parameter, e.g., always or when the parameter is within a first open or closed interval (e.g., N_sweeps<threshold).

A function that increases non-linearly with the parameter, e.g., at least when the parameter is within a second open or closed interval (e.g., N_sweeps>threshold).

A function that includes the addition of a fixed delta time if receiver beam sweeping is used, where the delta may depend on the number of receiver beams or the number of directions the UE may need to receive from (e.g., the number of measured cells or the number of different TPs or TRPs).

A function F=f_bestBeamsSweepsSearch+f_meas, where the UE searches for the best beam(s) or best beam sweep(s), selects the best one(s), and then on those performs further measurements, cell detection, etc. The best beam/beam sweep search (which may be performed on up to as many receive beams that are available for the search and supported by the UE, e.g., with the number of sweeps N_sweeps) may reduce the number of receive beams to be needed for the measurements (e.g., using the reduced number of sweeps N'_sweeps).

A first example function, applicable for cell detection, is:

$$TPSS/SSS = \max(T\min, \text{f\_bestBeamsSweepsSearch} + \text{f\_meas})$$
$$= \max(T\min, \text{f\_bestBeamsSweepsSearch} + [5] \times SMTC \text{ period}),$$

where also a minimum bound Tmin on the detection time is imposed and f_bestBeamsSweepsSearch may be e.g. [1]×N_sweeps×SMTC period. This is better (shorter time) than with a direct scaling approach: max(Tmin, [5]×SMTC period×N_sweeps).

A second example function is:

$$TPSS/SSS = \max(T\min, \text{f\_bestBeamsSweepsSearch}(N\_sweeps) + N2ssb \times SMTC \text{ period} \times N'\_sweeps),$$

where f_bestBeamsSweepsSearch(N_sweeps) is a function of N_sweeps, e.g.:

$$\text{f\_bestBeamsSweepsSearch}(N\_sweeps) = N1ssb \times N\_sweeps \times SMTC \text{ period},$$

where Nssb is the number of SSBs spent on beam/sweep search, and N2ssb is the number of SSbs spent for further measurements on the reduced beams/sweeps, and N_sweeps>N'_sweeps.

In one embodiment, measurement accuracy may depend on at least one parameter (see parameter examples above) related to how the UE is performing beamforming. For example, a worse accuracy than a first threshold may be used when the parameter is within a first open or closed interval (e.g., N_sweeps>second threshold), and a better accuracy than the first threshold may be used when the parameter is within a second open or closed interval (e.g., N_sweeps<second threshold).

In one embodiment, a target BLER (e.g. for channel or system information reading or hypothetical channel for RLM) may depend on at least one parameter (see parameter examples above) related to how the UE is performing beamforming. For example, a higher BLER may be targeted when the parameter is within a first open or closed interval (e.g., N_sweeps>threshold), and a lower BLER may be targeted when the parameter is within a second open or closed interval (e.g., N_sweeps<threshold).

In one embodiment, a minimum number of samples may be required for the measurement or receiving a channel on a serving carrier frequency and/or another carrier frequency. If the same receiver hardware is shared for two or more frequencies, then the requirements may be equally impacted (e.g., scaled or relaxed similar to how it is described for the measurement time above) on both frequencies. Alternatively, the requirements may be impacted (e.g., scaled or relaxed similar to how it is described for the measurement time as above) on both frequencies based on a priority or the sharing factor. Alternatively, the requirements may be impacted (e.g., scaled or relaxed as above) on one or a subset of the frequencies, if the remaining frequencies to measure have absolute priority.

In one embodiment, the UE may be required to perform a measurement over a first measurement time (T1) if the UE is also receiving data channel and/or control channel over time resources which at least partially overlaps with time resources (e.g. symbols containing CSI-RS resources, symbols containing SSB etc) used for the measurement. Alternatively, the UE may be required to perform a measurement over a second measurement time (T2) if the UE is not receiving any data channel or control channel over time resources which at least partially overlaps with time resources (e.g. symbols containing CSI-RS resources, symbols containing SSB etc) used for the measurement. In this example T2<T1. The shorter time is achieved in the second scenario due to the fact that the UE is able to reuse its resources (e.g. antenna arrays, FFT/IFFT etc) used for data/control channel reception for carrying out the receive beam sweeping for performing the measurement. The values of T1 and T2 depends on the number of receiver beam sweeps needed in different scenarios. In yet another example the value of T2 or the relation between T2 and T1 may further depend on the SCS of the RS and the SCS of the non-RS. The measurement is done on the RS while the non-RS refers to control channel and/or data channel. In one example if the SCS of RS and non-RS are the same then T2=T21; otherwise if the SCS of RS and non-RS are different then T2=T22 where T22<T21. Examples of T1 and T2 are 200 ms and 400 ms respectively. In another example T1=Nbs*T2 where Nbs=number of receive beam sweeps.

In another example, the UE is required to perform measurements based on certain rules. For example, the UE may be required to perform measurements on neighbor cells during a measurement time T1 if the UE is not performing measurements and not receiving signals/channel from a serving cell on the same carrier frequency during T1, while the UE performs measurements on neighbor cells during a measurement time T2 (T2>T1) if the UE is performing measurements and/or receiving signals/channels from a serving cell on the same carrier frequency during the time at least partly overlapping with T2 because the UE generally may not able to use the same receiver beam for the serving cell and neighbor cell at the same time and thus will perform one of them at a time. A serving cell may also be prioritized in which case performing neighbor cell measurements may take time T3>T2, compared to the case when no priorities are used as in T2.

In yet another example, the UE may be required to meet a first set of measurement requirements if it receives a disabling indicator from a network node disabling narrow-beam reception in the UE (and thus configuring widebeam or omnidirectional reception), while the UE may be required to meet a second set of measurement requirements if it does not receive the disabling indicator or receives an enabling indicator. In one example, the second set of requirements may comprise a longer measurement period in case of receiving the enabling indicator or (equivalently) not receiving the disabling indicator.

V. Additional Embodiments

Figure 2:
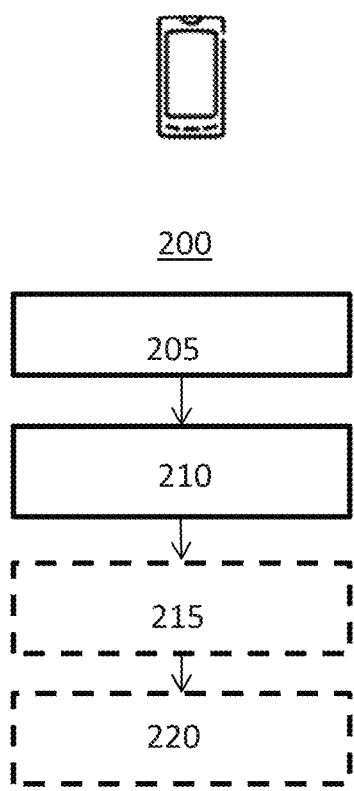
FIG. 2 is a flowchart illustrating a method of operating a wireless communication device.

FIG. 2 illustrates a method 200 performed by the wireless device 105 according to one or more embodiments. As shown in FIG. 2, the method 200 includes providing a first indication to a radio node of how the wireless device performs or will perform receiver beamforming (step 205). The method 200 further includes performing receiver beamforming as part of a signal measurement procedure in accordance with the first indication of how the wireless device performs or will perform receiver beamforming (step 210). In some embodiments, the method 200 further includes receiving a configuration message from the radio node (step 215); and based on the configuration message, configuring the signal measurement procedure in accordance with a measurement requirement determined by the radio node, the measurement requirement being determined based on how the wireless device performs or will perform receiver beamforming (step 220). The method may be adapted to include other optional steps as well.

For example, as noted above, a wireless device provides an indication (whether implicitly or explicitly) of how it is performing or going to perform receiver beamforming and/or may provide an indication of the applicable measurement requirement the wireless device is able to meet based on how it is performing or going to perform its receiver beamforming. Thus, in one embodiment of method 200, step 205 includes providing a second indication of the applicable measurement requirement the wireless device is able to meet based on how it is performing or going to perform its receiver beamforming. The second indication may be provided in addition to or instead of the first indication. Moreover, step 210 may include performing receiver beamforming as part of a signal measurement procedure in accordance with the second indication instead of or in addition to performing receiver beamforming in accordance with the first indication.

Figure 3:
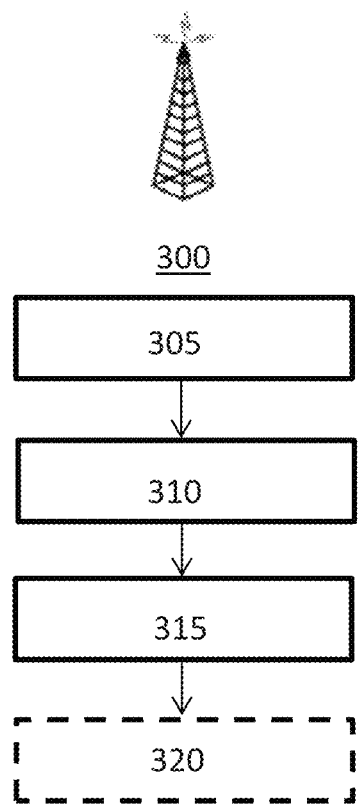
FIG. 3 is a flowchart illustrating a method of operating a radio access node.

FIG. 3 illustrates a method 300 performed by radio access node, such as a base station 110 operable to communicate wirelessly with a wireless device. The method 300 includes receiving a first indication from a wireless device of how the wireless device performs or will perform receiver beamforming (step 305). The method further includes determining a measurement requirement for the wireless device to meet as part of a signal measurement procedure based on the first indication (step 310). The method further includes configuring the wireless device to perform the signal measurement procedure adaptively in accordance with the determined measurement requirement (step 315). In some embodiments, the method further includes configuring a procedure performed by the radio access node in accordance with the determined measurement requirement (step 320). The method may be adapted to include other optional steps as well.

For example, as noted above, a wireless device provides an indication (whether implicitly or explicitly) of how it is performing or going to perform receiver beamforming and/or may provide an indication of the applicable measurement requirement the wireless device is able to meet based on how it is performing or going to perform its receiver beamforming. Thus, in one embodiment of method 300, step 305 includes receiving a second indication of the applicable measurement requirement the wireless device is able to meet based on how it is performing or going to perform its receiver beamforming. The second indication may be received in addition to or instead of the first indication. Moreover, step 310 may include determining a measurement requirement for the wireless device to meet as part of a signal measurement procedure based on the second indication instead of or in addition to determining the measurement requirement based on the first indication.

Note that a wireless device 105 as described above may perform the method in FIG. 2 and any other processing herein by implementing any functional means or units. In one embodiment, for example, the wireless device 16 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 4:
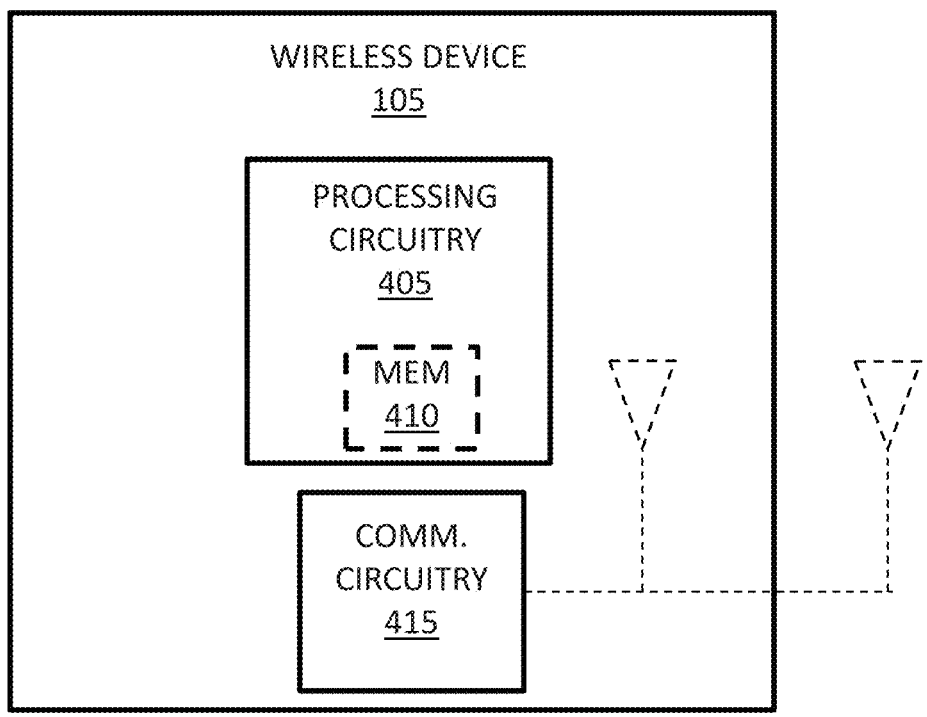
FIG. 4 is a schematic diagram illustrating a wireless communication device.

FIG. 4 for example illustrates the wireless device 105 in accordance with one or more embodiments. As shown, the wireless device 105 includes processing circuitry 405 and communication circuitry 415. Additional circuitry and components are not shown but may be included, such as power supply circuitry (e.g., a battery), a display, an input keypad, etc. The communication circuitry 415 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the wireless device 105 as shown. The processing circuitry 405 is configured to perform processing described above, such as by executing instructions stored in memory 410, whereby the wireless device 105 is configured to perform the method in FIG. 2. The processing circuitry 405 in this regard may implement certain functional means, units, or modules.

Figure 5:
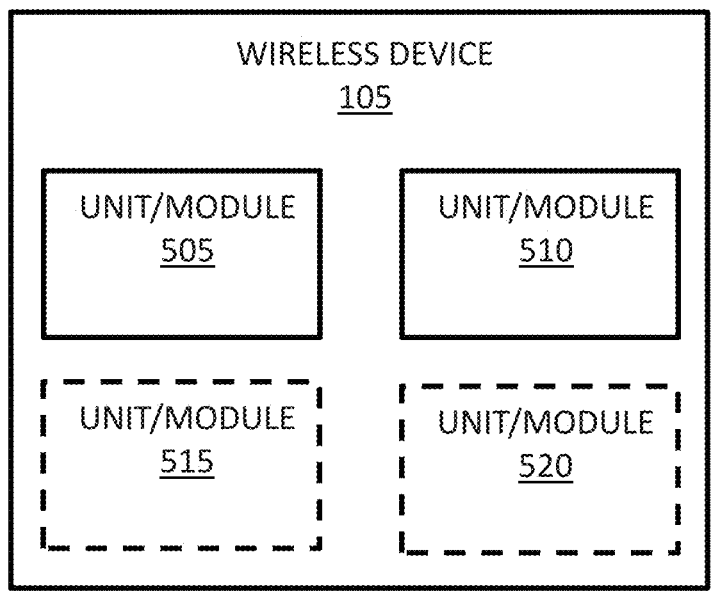
FIG. 5 is a functional block diagram illustrating a wireless communication device.

FIG. 5 illustrates the wireless device 105 in accordance with one or more other embodiments. As shown, wireless device 105 implements various functional means, units, or modules, e.g., via the processing circuitry 405 in FIG. 4 and/or via software code, for implementing the functionality described above (e.g., for implementing the steps in FIG. 2). These functional means, units, or modules include for instance units/modules 505, 510, 515, and 520 corresponding to the steps 205, 210, 215, and 220, respectively in FIG. 2.

Also note that the radio access node as described above may perform the processing in FIG. 3 and/or any processing herein, by implementing any functional means or units. The radio access node may be for instance a base station or transmission point controlling one or more wireless devices to boost power as needed. In one embodiment, the radio access node comprises respective circuits or circuitry configured to perform the steps of processing described herein (e.g., signaling). The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6:
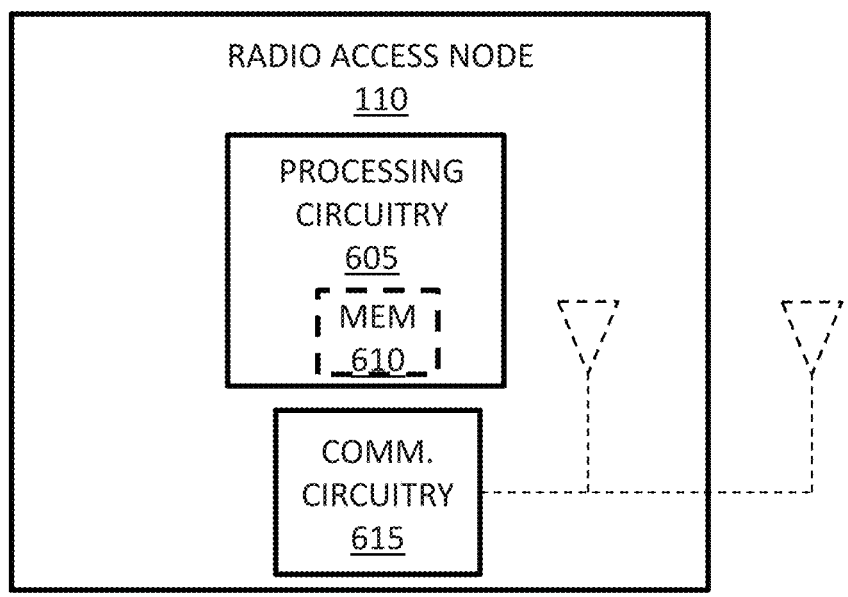
FIG. 6 is a schematic diagram illustrating a radio access node.

FIG. 6 for example illustrates the radio access node 110 in accordance with one or more embodiments. As shown, the radio access node 110 includes processing circuitry 605 and communication circuitry 615. The communication circuitry 615 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the radio access node 110 as shown. The processing circuitry 605 is configured to perform processing described above, such as by executing instructions stored in memory 610, wherein the radio access node 110 is configured to perform the method in FIG. 3. The processing circuitry 605 in this regard may implement certain functional means, units, or modules.

Figure 7:
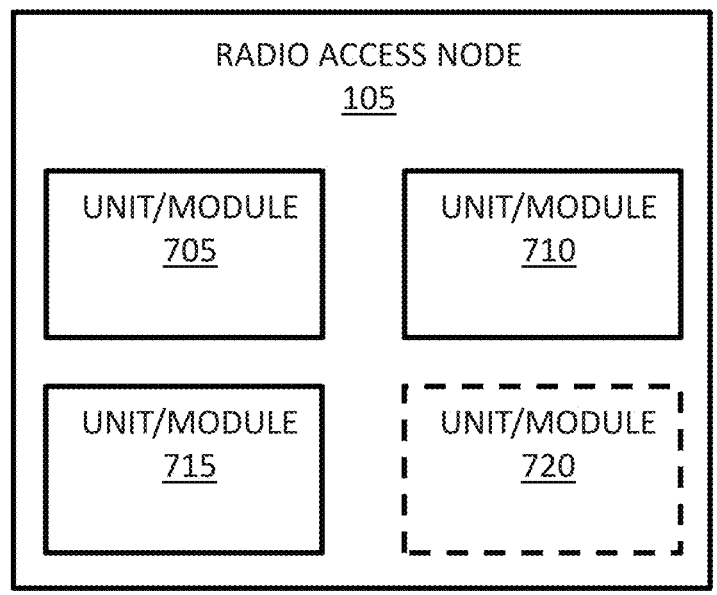
FIG. 7 is a functional block diagram illustrating a radio access node.
Figure 8:
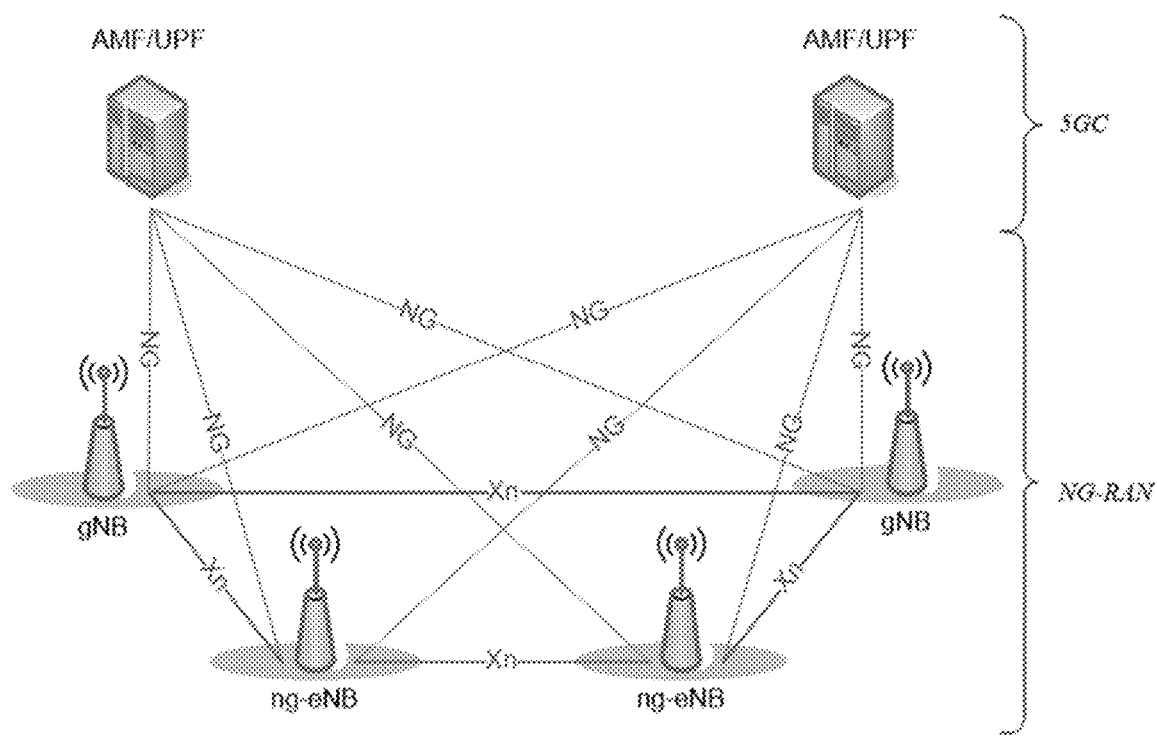
FIG. 8 is a graphical illustration of an example architecture of a wireless communication network.
Figure 9:
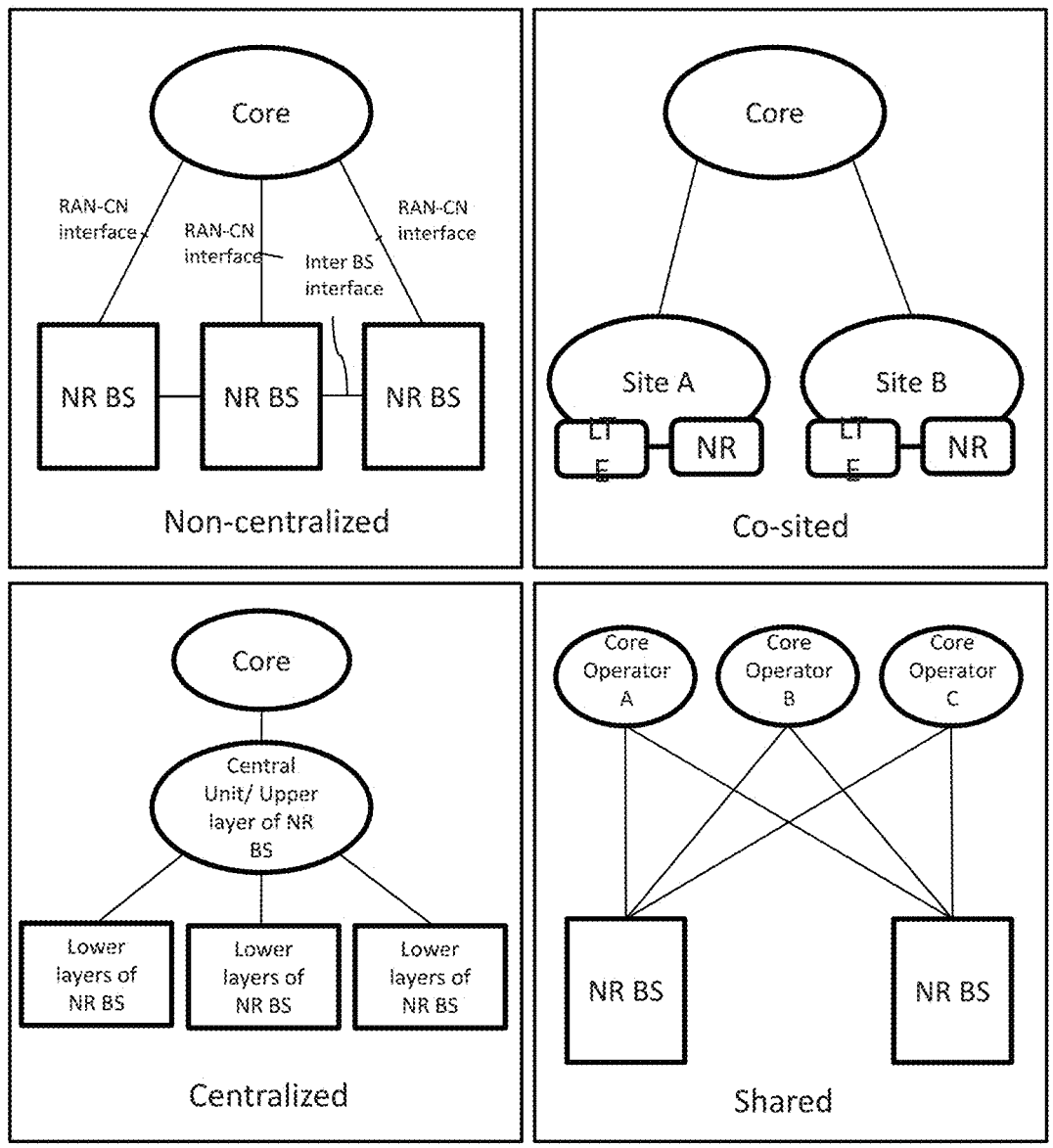
FIG. 9 is a graphical illustration of four different deployment scenarios of a wireless communication network with NR BSs.
Figure 10:
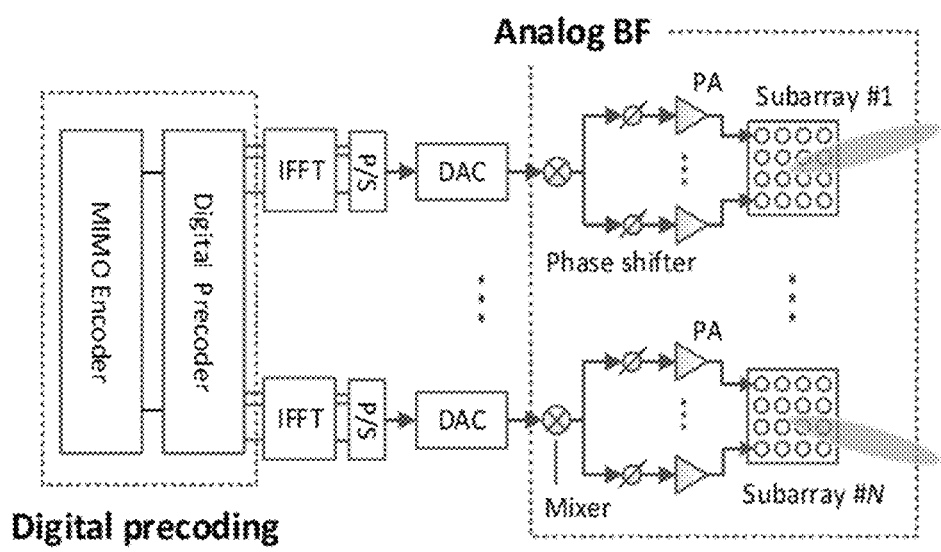
FIG. 10 is a schematic diagram of circuitry for performing hybrid beamforming.
Figure 11:
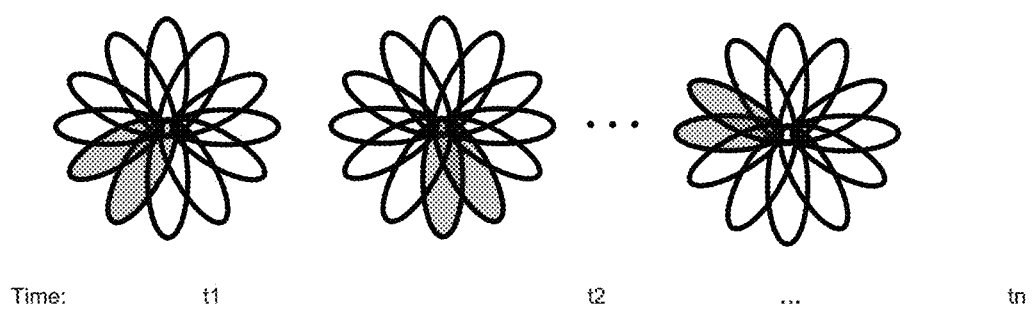
FIG. 11 is a graphical illustration of wireless signal beams being swept on two subarrays at a series of instances in time.
Figure 12:
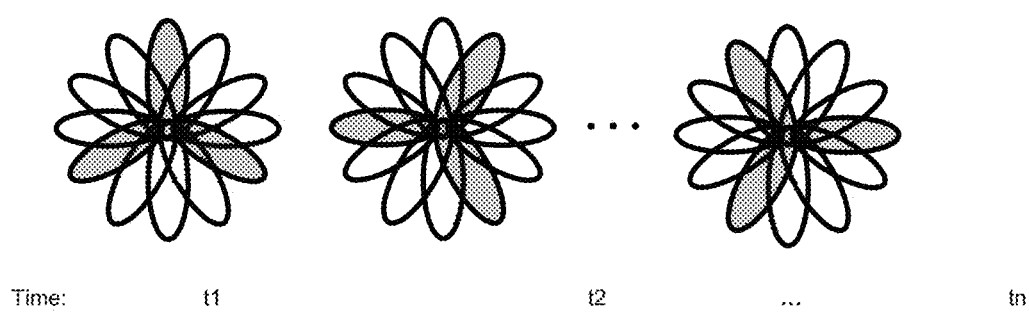
FIG. 12 is a graphical illustration of wireless signal beams being swept on three subarrays at a series of instances in time.

FIG. 7 illustrates radio access node 110 in accordance with one or more other embodiments. As shown, radio access node 110 implements various functional means, units, or modules, e.g., via the processing circuitry 605 in FIG. 6 and/or via software code, for implementing the functionality described above (e.g., for implementing the steps in FIG. 3). These functional means, units, or modules include for instance units/modules 705, 710, 715, and 720 corresponding to the steps 305, 310, 315, and 320, respectively in FIG. 3.

Those skilled in the art will also appreciate that embodiments herein further include corresponding computer programs. A computer program comprises instructions which, when executed on at least one processor of a wireless device 16, cause the wireless device 16 to carry out any of the respective processing described above. A computer program in this regard may comprise one or more code modules corresponding to the means or units described above.

In other embodiments, a computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing any of these computer programs. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of the wireless device 16 or network equipment, cause the wireless device 16 or network equipment to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for controlling signal measurements in a wireless device with receiver beamforming capability, the method being performed by the wireless device and comprising:
providing a first indication to a radio node of how the wireless device performs or will perform receiver beamforming;
providing a second indication to the radio node of a measurement requirement the wireless device is able to meet, the measurement requirement being determined based on how the wireless device performs or will perform receiver beamforming, wherein the measurement requirement comprises at least one of:
an association between a number of receive beam sweeps required for performing a measurement and one or more of: (i) a signal level, (ii) a signal quality, and a (iii) carrier frequency or frequency range,
a number of beam sweeps required for certain types of measurements, and a number of receive beam sweeps required for measurements as a function of a number of carrier frequencies on which the measurements are to be performed;

performing receiver beamforming as part of a signal measurement procedure in accordance with the first indication of how the wireless device performs or will perform receiver beamforming and the second indication of the measurement requirement.

2. The method of claim 1, wherein the radio node is another wireless device.

3. The method of claim 1, wherein the radio node is a radio access node.

4. The method of claim 1, wherein the first indication is explicit.

5. The method of claim 1, wherein the first indication is implicit.

6. The method of claim 1, further comprising:
receiving an enabling/disabling indicator from the radio access node, the enabling/disabling indicator controlling whether the wireless device is allowed to perform receiver beamforming.

7. The method of claim 1, wherein performing receiver beamforming includes beam sweeping.

8. The method of claim 1, wherein the first indication includes a number of receiver beam sweeps required by the UE for performing a measurement.

9. The method of claim 8, wherein the number of receiver beam sweeps is based on a signal quality parameter of a signal to be measured.

10. The method of claim 1, wherein the first indication includes an indication of whether the wireless device can adapt a number of receiver beam sweeps required for performing a measurement, wherein the adaptation is based on whether or not the wireless device is receiving and/or transmitting signals other than a reference signals (RS) used for the measurement.

11. A wireless device for operation in a wireless communication network, the wireless device comprising:
processing circuitry configured to:
provide a first indication to a radio node of how the wireless device performs or will perform receiver beamforming;
provide a second indication to the radio node of a measurement requirement the wireless device is able to meet, the measurement requirement being determined based on how the wireless device performs or will perform receiver beamforming, wherein the measurement requirement comprises at least one of:
an association between a number of receive beam sweeps required for performing a measurement and one or more of: (i) a signal level, (ii) a signal quality, and a (iii) carrier frequency or frequency range,
a number of beam sweeps required for certain types of measurements, and
a number of receive beam sweeps required for measurements as a function of a number of carrier frequencies on which the measurements are to be performed;
perform receiver beamforming as part of a signal measurement procedure in accordance with the first indication of how the wireless device performs or will perform receiver beamforming and the second indication of the measurement requirement; and communication circuitry configured to transmit/receive transmissions to/from one or more radio access nodes in the wireless communication network.

12. The wireless device of claim 11, wherein performing receiver beamforming includes beam sweeping.

13. The wireless device of claim 12, wherein the indication of the measurement requirement is implicit.

14. A radio access node for operation in a wireless communication network, the radio access node comprising:
processing circuitry configured to:
receive an first indication from the wireless device of how the wireless device performs or will perform receiver beamforming;
receive a second indication of a measurement requirement the wireless device is able to meet based on how the wireless device performs or will perform receiver beamforming, wherein the measurement requirement comprises at least one of:
an association between a number of receive beam sweeps required for performing a measurement and one or more of: (i) a signal level, (ii) a signal quality, and a (iii) carrier frequency or frequency range,
a number of beam sweeps required for certain types of measurements, and
a number of receive beam sweeps required for measurements as a function of a number of carrier frequencies on which the measurements are to be performed;
determine a measurement requirement for a wireless devices to meet as part of a signal measurement procedure based on the first indication and the second indication; and
communication circuitry configured to configure the wireless device to perform the signal measurement procedure adaptively in accordance with the determined measurement requirement.

15. The radio access node of claim 14, wherein the processing circuitry is further configured to: receive an enabling/disabling indicator from the radio access node, the enabling/disabling indicator controlling whether the wireless device is allowed to perform receiver beamforming.

16. A method for controlling signal measurements in a wireless device with receiver beamforming capability, the method being performed by a radio access node and comprising:
receiving an first indication from the wireless device of how the wireless device performs or will perform receiver beamforming;
receiving a second indication of a measurement requirement the wireless device is able to meet based on how the wireless device performs or will perform receiver beamforming, wherein the measurement requirement comprises at least one of:
an association between a number of receive beam sweeps required for performing a measurement and one or more of: (i) a signal level, (ii) a signal quality, and a (iii) carrier frequency or frequency range,
a number of beam sweeps required for certain types of measurements, and
a number of receive beam sweeps required for measurements as a function of a number of carrier frequencies on which the measurements are to be performed;

determining a measurement requirement for a wireless devices to meet as part of a signal measurement procedure based on the first indication and the second indication; and configuring a wireless device to perform the signal measurement procedure adaptively in accordance with the determined measurement requirement.

17. The method of claim 16, wherein the indication of the measurement requirement is implicit.

* * * * *